United States Patent [19]

Ho et al.

[11] 3,755,793

[45] Aug. 28, 1973

[54] LATENT IMAGE MEMORY WITH SINGLE-DEVICE CELLS OF TWO TYPES

[75] Inventors: Irving T. Ho, Poughkeepsie; Gerald A. Maley, Fishkill; Hwa N. Yu, Yorktown Heights, all of N.Y.

[73] Assignee: International Business Machines Corporation, Armonk, N.Y.

[22] Filed: Apr. 13, 1972

[21] Appl. No.: 243,793

[52] U.S. Cl. ............. 340/173 R, 307/238, 307/304, 340/173 SP

[51] Int. Cl. ... G11c 7/00, H03k 25/02, G11c 11/34

[58] Field of Search ................. 340/173 SP, 173 FF, 340/173 CA, 173 R; 307/238, 279, 304; 317/235 R

[56] References Cited

UNITED STATES PATENTS

| | | | |
|---|---|---|---|
| 3,662,351 | 5/1972 | Ho | 340/173 SP |
| 3,618,052 | 11/1971 | Kwei | 340/173 FF |
| 3,201,764 | 8/1965 | Parker | 340/173 SP |
| 3,654,499 | 4/1972 | Smith | 340/173 CA |

*Primary Examiner*—Bernard Konick
*Assistant Examiner*—Stuart N. Hecker
*Attorney*—Martin G. Reiffin et al.

[57] ABSTRACT

A latent image memory is selectively operable as either a read-write memory or a read-only memory. The memory comprises an array of cells each preferably consisting of a single active device. A first set of the cells are each adapted to store either one of two binary digits. A second set of the cells are each responsive to a first condition for storing either one of two binary digits and responsive to a second condition for storing only a single predetermined binary digit. Means are provided for selecting either the first condition to render the array operable as a read-write memory, or the second condition to render the array operable as a read-only memory. Each of the cells of the first set preferably comprises a field-effect transistor connected to a capacitor, and each of the cells of the second set preferably comprises a charge-coupled device.

31 Claims, 8 Drawing Figures

LATENT IMAGE MEMORY WITH SINGLE-DEVICE CELLS OF TWO TYPES

CROSS-REFERENCES TO RELATED APPLICATIONS

1. United States Application Ser. No. 23,609, filed Mar. 30, 1970, entitled "Alterable-Latent Image Monolithic Memory", in the name of I. T. Ho, G. A. Maley and R. Waxman, now U.S. Pat. No. 3,662,351, issued May 9, 1972, and assigned to the assignee of the present application, discloses a latent image memory.

2. United States Application Ser. No. 169,961, filed Aug. 9, 1971, entitled "Charge-Coupled Random Access Memory Cell", in the name of N. G. Anantha and T. Chiu, and assigned to the assignee of the present application, discloses a random access memory wherein each memory cell comprises a charge-coupled device.

BACKGROUND OF THE INVENTION

1. Field of the Invention

This invention relates to random access memories for use in digital computers and other data processing equipment and which are of the latent image type: that is, the memory is selectively operable as either a read-write memory or a read-only memory.

2. Description of the Prior Art

In the present state of the art, general-purpose digital computers contain control programs or software called the "operating system" and comprising a supervisor, input/output control, an initial program load, and diagnostic programs. The supervisor controls the sequence of execution of the applications programs to be run on the machine and starts each successive program upon termination of the program being executed. The input/output control starts the operation of input/output peripheral devices such as printers, disk and tape machines, and card readers. The initial program load is a set of initial instructions used to set the machine up in preparation for starting the execution of a program. The diagnostic programs are used to determine the locations of defects in the machine.

The operating system is frequently stored in disk storage and then read into the main memory of the computer as required. This arrangement is disadvantageous in that it consumes computer time and takes up main memory space. In some of the more recent computers part of the operation system, such as the initial program load and some simple supervisor routines, are stored in an auxiliary read-only memory. The latter may also store microprograms which provide standard mathematical operations and other frequently used routines. This arrangement requires two memory systems: a main memory for read-write operations and an auxiliary memory for read-only operations.

It has been proposed to obviate the necessity for two different memory systems by providing that the main memory be of the latent image type: that is, capable of operating as either a read-write memory or a read-only memory. For example, said Application Ser. No. 23,609 discloses a latent image memory. United States Pat. No. 3,618,052 issued Nov. 2, 1971 in the name of Thomas Kwei discloses another form of latent image memory. With these arrangements, a single memory can perform read-write functions and can also store latent information for retrieval when operated in a read-only mode.

In both of these latent image memories of the prior art, when the memory system is first powered up, each memory cell of the array automatically assumes a predetermined logical state; that is, either a 0 or a 1. The latent information thus permanently stored in the array may be accessed and read so that the memory functions in the read-only mode. Different information may then be written into the array to enable the same memory to function in the read-write mode.

Therefore, in order to access the latent information stored in these prior latent image memories, it is necessary first to power down the system and then to power up the system. This is disadvantageous in that the powering down and up operations are relatively slow and consume valuable computer time, and also because these powering operations may disturb other parts of the computer.

Another important disadvantage of the prior latent image memories resides in the fact that they comprise memory cells each having at least two active devices connected to form a bistable circuit or so-called flip-flop. These two-device cells, when embodied in monolithic integrated circuits, require more chip area per bit than single-device memory cells such as the charge-coupled devices disclosed in said Application Ser. No. 169,961 or the field-effect transistors disclosed in U.S. Pat. No. 3,387,286, issued June 4, 1968 to R. H. Dennard. The two-device latent image memory cells of the prior art therefore result in lower circuit density and higher cost per bit than single-device cells.

The bistable memory cells of prior art latent image memories are also relatively disadvantageous in that they operate in a static mode rather than a dynamic mode; that is, in order to retain information, one of the two transistors of each memory cell must be continuously conductive. This results in greater power dissipation as comapred with single-device memory cells which operate in a dynamic mode. The greater power dissipation makes cooling more difficult and more expensive, and requires a relatively lower circuit density and therefore greater cost per bit.

The cost of prior art latent image memories having two-device cells is further increased relative to that of single-device memory cells by virtue of the more complex process technology required and the resultant lower manufacturing yields.

Because of the relatively high cost of prior latent image memories, it is not feasible in the present state of the art to use these prior memories for the read-only storage of more than a relatively small portion of the operating system.

SUMMARY OF THE INVENTION

It is therefore a primary object of the present invention to provide a novel latent image memory which obviates the above-noted disadvantages and defects of the prior art and which provides the advantages of single-device memory cells such as, for example, the field-effect transistor devices of said U.S. Pat. No. 3,387,286 and the charge-coupled devices of said Application Ser. No. 169,961.

More specifically, the latent image memory in accordance with the present invention does not require an initial powering down and powering up to "develop" the latent image for operation in the read-only mode. Instead, the permanently stored latent information may be read at any time, independently of manipulating the power supply, by changing the bias voltage on the holding electrodes of the capacitors and charge-coupled devices. When it is then desired to operate the memory in the read-write mode, the bias voltage on the holding electrodes is then restored to the value required for this mode of operation.

A further object is to provide a novel latent image memory comprising memory cells each having a single active device, thereby providing for embodiment in the form of monolithic integrated circuitry having high density with resultant low manufacturing cost and high operating speed. In the preferred embodiment of the invention, this object is achieved by an array of memory cells wherein some of the cells each comprise a field-effect transistor connected to a capacitor as disclosed in said U.S. Pat. No. 3,387,286 and the remaining cells comprise a charge-coupled device as disclosed in said Application Ser. No. 169,961. Both types of devices may be simultaneously formed in a single monolithic memory chip by the same manufacturing process compatible to both types.

Still another object of the invention is to provide a novel latent image memory wherein the cells operate in a dynamic mode so as to produce less power dissipation and thereby permit higher circuit density per chip and simpler and more economical cooling arrangements.

Still another object of the present invention is to provide a novel latent image memory which may be realized with a simple single-device process technology providing relatively high yields and low costs in manufacture.

By virtue of the relatively low cost of a latent image memory in accordance with the present invention, it becomes feasible to store substantial portions of the operating system, or even the entire operating system, in permanent latent image form for access in the read-only mode. The latter may also be used for array logic operations and microprograms.

In the preferred embodiment of the invention shown in the drawings and described in detail below for the purpose of illustrating one of the many forms which the invention may take in practice, the above-noted objects and advantages are achieved by a novel construction comprising an array of memory cells arranged in rows and columns, with a first set of said cells each comprising a field-effect transistor and a capacitor connected thereto, and a second set of said cells each comprising a charge-coupled device. Each of the field-effect transistors and charge-coupled devices has a substrate of one conductivity type, a region therein of the opposite conductivity type, and a gate extending adjacent to and insulated from the substrate. Each of the capacitors and charge-coupled devices has a holding electrode.

A plurality of word lines are each connected to the gates of a respective row of cells, and a plurality of bit lines are each connected to the opposite conductivity type regions of a respective column of cells. Line drivers are connected to the word and bit lines, and sense amplifiers are also connected to the bit lines. Means are provided for selectively applying to the holding electrodes of the capacitors and charge-coupled devices either a first voltage to render the array operable as a read-write memory or a second voltage to render the array operable as a read-only memory.

DESCRIPTION OF THE PREFERRED EMBODIMENT

SCHEMATIC STRUCTURE

Figure 1:
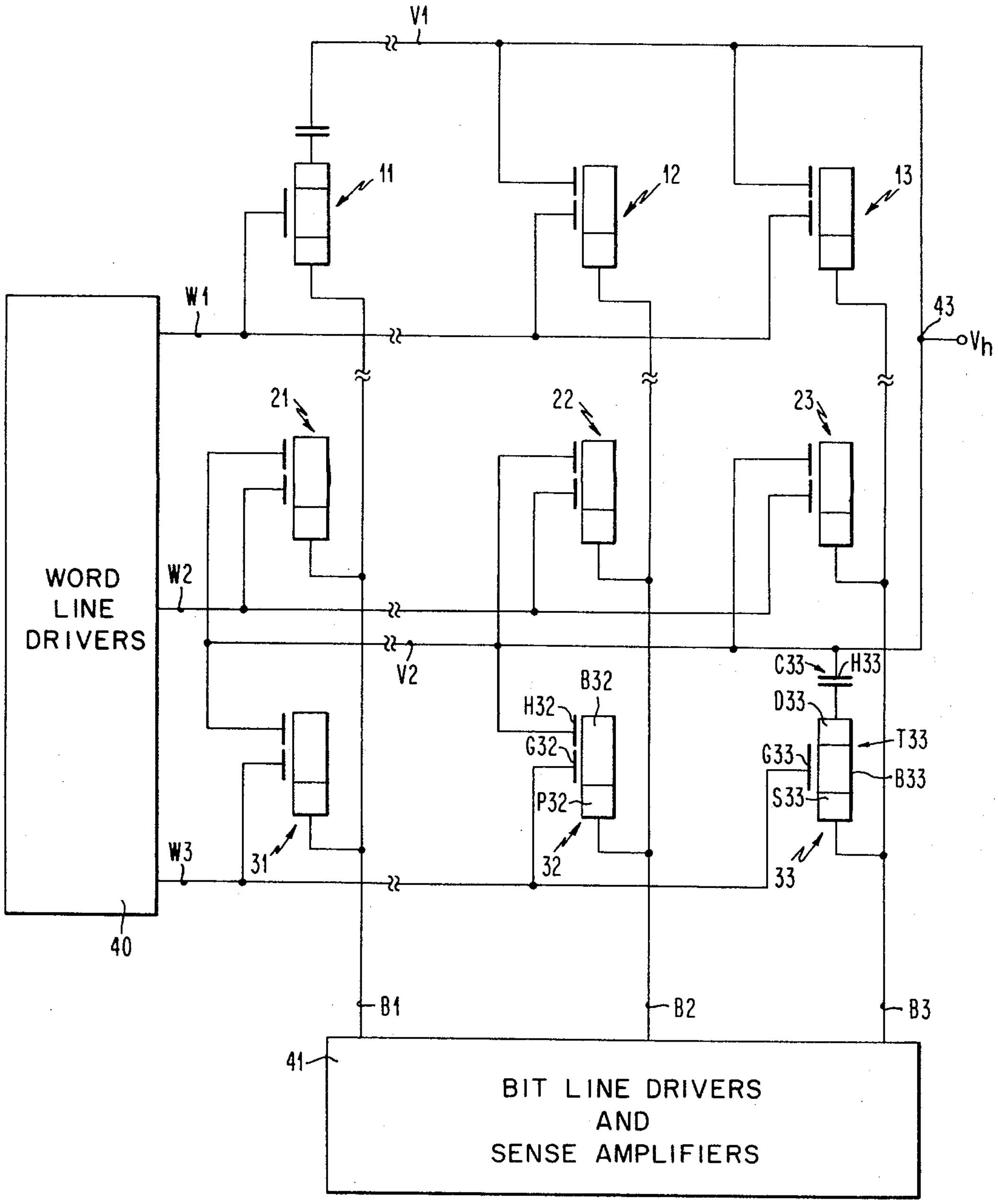
FIG. 1 is a schematic circuit diagram showing three rows and three columns of an array of memory cells in accordance with the present invention.

Referring first to FIG. 1, there is shown a schematic diagram symbolically depicting three rows and three columns of memory cells of an array having in practice many more rows and columns which are not shown for clarity in illustration. The first row comprises cells 11, 12 and 13; the second row comprises cells 21, 22 and 23; and the third row comprises cells 31, 32 and 33. Cells 11 and 33 each comprise a field-effect transistor connected to a capacitor, and the remaining cells each comprise a charge-coupled device.

More specifically, cell 33 comprises a substrate or silicon semiconductor body portion B33 having at the lower end a source S33 and at the upper end a drain D33. In the preferred embodiment of the invention in the form of a monolithic integrated circuit, the silicon semiconductor substrate is a single unitary chip common to all the cells of the array. In space adjacent relation to substrate B33 is a gate G33. These elements cooperate to form a P-channel field-effect transistor T33. A capacitor C33 is connected to drain D33 and has a holding electrode H33. Cell 11, and all other cells not shown and of the field-effect transistor type, are similarly constructed.

Cell 32 comprises a substrate or semiconductor body portion B32 having at one end a diffused P-type region P32. A gate G32 and a holding electrode H32 are located in spaced adjacent relation to the substrate portion B32. All of the other array cells of the charge-coupled device type are similarly constructed.

A first word line W1 is connected to the gates of cells 11, 12, 13 of the first row; a second word line W2 is connected to the gates of cells 21, 22, 23 of the second row; and a third word line W3 is connected to the gates of cells 31, 32, 33 of the third row. It will be understood that for each row of cells not shown there is provided a respective word line connected to the gates of that row of cells. All of the word lines, as indicated by W1, W2, W3, are connected to respective word line drivers symbolized by the block 40.

The sources and diffused regions of cells 11, 21, 31, etc. of the first column of the array are connected to a bit line B1; the sources and diffused regions of cells 12, 22, 32, etc. of the second column of the array are connected to a second bit line B2; and the sources and diffused regions of cells 13, 23, 33, etc. of the third column are connected to a third bit line B3. It will be understood that for each of the other columns (not shown) of the array, there is provided a bit line connected to the sources and diffused regions of the respective cells of that column. Bit lines B1, B2, B3, etc. are connected to respective bit line drivers and sense amplifiers symbolized by the block 41.

The holding electrodes of cells 11, 12, 13, etc. of the first row are connected to a first voltage bias line V1; and the holding electrodes of cells 21, 22, 23, etc. of the second row and of cells 31, 32, 33, etc. of the third row are connected to a second bias voltage line V2. It will be understood that for the other rows not shown there are provided additional bias voltage lines connected to the holding electrodes. All of the bias voltage lines V1, V2, etc. are connected to a common node 43 to which may be applied a holding electrode bias voltage designated by the symbol $V_h$.

Figure 2:
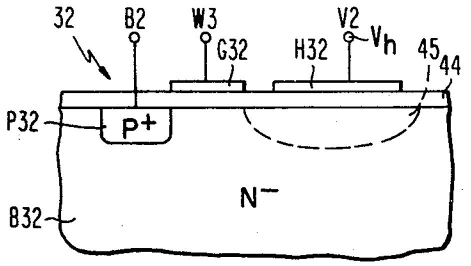
FIG. 2 is a schematic cross-sectional view of a charge-coupled device constituting some of the memory cells of the array of FIG. 1.

Referring now to FIG. 2, there is shown a schematic cross-section of the charge-coupled device constituting the memory cell 32. It will be understood that the other charge-coupled device memory cells are similarly constructed. The substrate or semi-conductor body portion B32 is of $N^-$ conductivity type. In the preferred embodiment, the memory system is formed as a monolithic integrated circuit and therefore substrate B32 is common to all of the memory cells of the array. A silicon dioxide layer 44 is formed over the upper surface of substrate B32. A $P^+$ conductivity type region P32, formed by diffusion, ion implantation or other process, is provided in substrate B32 adjacent the interface between the latter and silicon dioxide layer 44. Bit line B2 is connected to $P^+$ region P32.

Gate G32, preferably of aluminum, is located adjacent the upper surface of silicon dioxide layer 44 and is connected to word line W3. Holding electrode H32, also preferably of aluminum, is provided adjacent the upper surface of silicon dioxide layer 44 and is located adjacent gate G32. Holding electrode H32 is connected to bias voltage line V2. A depletion storage region, indicated by dashed lines and the reference numeral 45, is formed in substrate B32 adjacent the upper surface thereof in vertical alignment with holding electrode H32.

Figure 3:
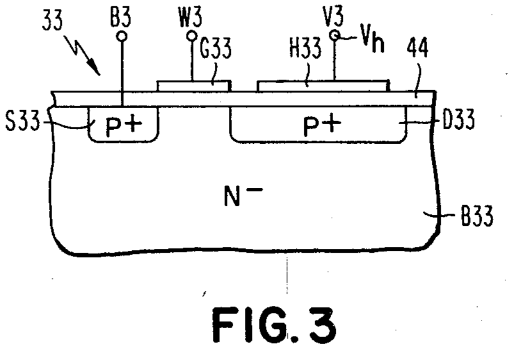
FIG. 3 is a schematic cross-sectional view of a field-effect transistor and capacitor connected thereto and symbolizing the construction of the other memory cells of the array of FIG. 1.

Referring now to FIG. 3, there is shown a schematic cross-section of the field-effect transistor and capacitor constituting memory cell 33. Memory cell 11, and all other cells (not shown) comprising a field-effect transistor and a capacitor, are similarly constructed. The substrate or semiconductor body portion B33 is of $N^-$ conductivity type and is common to all of the memory cells of the array when the invention is embodied in the form of a monolithic integrated circuit. Extending over the upper surface of substrate B33 is the silicon dioxide layer 44 described above with respect to FIG. 2. Source S33 is formed in substrate B33 adjacent the upper surface thereof and drain D33 is also provided adjacent said upper surface in lateral spaced relation to source S33. Source S33 and drain D33 are $P^+$ conductivity type and may be formed by diffusion, ion implantation or other process. It will be understood that the designations "source" and "drain" for regions S33, D33 are arbitrary in that when capacitor C33 (FIG. 1) is being charged by field-effect transistor T33, the region S33 acts as a source and the region D33 acts as a drain; however, when capacitor C33 is discharging through field-effect transistor T33, then region S33 acts as a drain and region D33 acts as a source.

Gate G33, preferably of aluminum, is provided on the upper surface of silicon dioxide layer 44 and is located substantially midway between source S33 and drain D33. Holding electrode H33 is also provided on the upper surface of silicon dioxide layer 44 and in substantial vertical alignment with drain D33. Bit line B3 is connected to source S33; word line W3 is connected to gate G33; and bias voltage line V2 is connected to holding electrode H33. Holding electrode H33 constitutes one of the plates of capacitor C33 (FIG. 1) and the other plate of capacitor C33 is realized by the upper surface of drain region D33.

OPERATION IN THE READ-WRITE MODE

Figure 4:
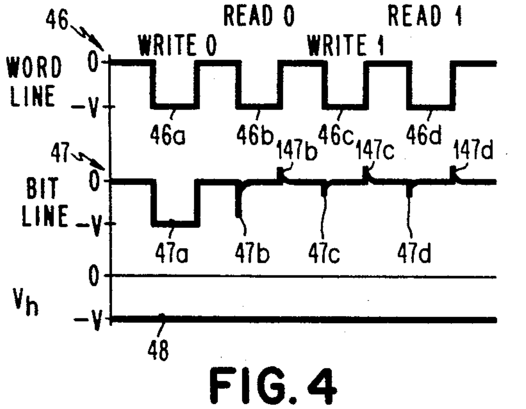
FIG. 4 shows the signal voltages on the word and bit lines and holding electrodes when the latter are biased for operation of the array as a read-write memory, the signal voltages being the same for both the charge-coupled device memory cells and the field-effect transistor memory cells.

Referring now to FIG. 4, there are shown the signals on the word line, bit line and bias voltage line for both a charge-coupled device cell and a field-effect transistor cell for the four successive operations of "Write O", "Read 0", "Write 1", and "Read 1". A logical 1 is defined as the presence of holes in storage region 45 or containing equilibrium amount of holes in drain region D33, and a logical 0 is defined as the absence of holes in said storage region 45 or certain depletion of holes in drain region D33. These definitions are the reverse of those employed in the description of said Application Serial No. 169,961 where the presence of holes is defined as a logical 0 and the absence of holes is defined as a logical 1. The signal on the word line (for example, W3) and hence on the gates of the respective row of cells (for example, G32 and G33) is indicated by the reference numeral 46. The signal on the bit lines (for example, B2 and B3) and hence on the P-type regions (for example, P32 and S33) is indicated by the reference numeral 47. The bias voltage on the bias voltage lines (for example, V2) and hence on the holding electrodes (for example, H32 and H33) is designated by the reference numeral 48.

For operation as a read-write memory, bias voltage $V_h$ is maintained at a negative potential indicated at 48 as −V volts. In the preferred embodiment, the magnitude of V is equal approximately to 10 volts. For the "Write O" operation, negative pulse 46a with an amplitude of V volts is applied to word line W3, assuming that the lowest row of memory cells in FIG. 1 is to be selected. A negative pulse 47*a* with an amplitude of V volts is also applied to bit line B2 if memory cell 32 is to be selected, or to bit line B3 if memory cell 33 is to be selected. The resulting negative potential on gate G32 or G33 causes holes to be attracted to the surface of substrate B32 or B33 immediately beneath gate G32 or G33 so as to invert the region beneath the gate and to cause a p-type channel to extend laterally from P-type region P32 or S33 to region 45 or D33, depending upon whether cell 32 or 33 is to be selected. The negative pulse 47*a* causes P-type region P32 or S33 to have a lower potential than region 45 or D33, respectively. As a result, any holes stored in region 45 flow to the left as shown in the drawing and through the inversion channel and then through P-type region P32 and then through the bit line B2. Storage region 45 is thus cleared of holes if the "Write O" operation is performed on cell 32. Similarly, holes in equilibrium in drain region D33 before the "Write 0" operation will flow to the left during the "Write 0" operation under the influence of the lower potential at source region S33 and thus D33 is deprived of its equilibrium amount of holes or capacitor C33 is thus discharged if the "Write 0" operation is performed on cell 33. The potential of region 45 or D33 beneath the holding electrodes will thus approach 31 V.

For the "Read 0" operation, a negative pulse 46b with an amplitude of –V volts is applied to word line W3, assuming that the lowest row of memory cells in FIG. 1 is to be selected. A P-type inversion channel is thus formed at the upper surface of substrate B32 or B33 below the gate G32 or G33. Because the potential of region 45 or D33 beneath the holding electrodes is lower than the potential of the respective P-type region P32 or S33, which is now at zero voltage, holes flow from region P32 or S33 through the inversion channel to region 45 or D33. This flow of holes produces a flow of current and a resulting negative voltage pulse 47b on those bit lines B1, B2, B3 corresponding to those memory cells 31, 32, 33 which are storing a logical 0; that is, those memory cells which have an absence of holes in the region 45 or D33. For example, if cell 32 is selected for the "Read 0" operation, then pulse 47*b* appears on bit line B2 and is sensed by the respective sense amplifier (not shown) connected thereto, whereas if cell 33 is selected then pulse 47*b* appears on bit line B3 and is sensed by the respective sense amplifier (not shown) connected to that bit line. At the trailing edge of pulse 46*b* the potential on word line W3 rises abruptly to its original ground level and stray capacitance coupling causes a small positive voltage spike 147b to appear on the bit line. After "Read 0" the potential of region 45 or D33 approaches zero voltage.

For the "Write 1" operation a negative pulse 46*c* of a magnitude –V volts is applied to the word line(for example, W3) thereby causing a P-type inversion channel to form beneath gate G32 or G33. If the previous operation had been a "Read 0" or a "Read 1", then holes are already stored in region 45 or holes are in equilibrium in region D33 and capacitor C33 is charged up. Therefore, no holes flow during the "Write 1" operation and only a small negative voltage spike 47*c* appears on the bit line due to stray capacitance. If the preceding operation had been a "Write 0", then region 45 or D33 is substantially devoid of holes and capacitor C33 is in a discharged state. In this event, during the "Write 1" operation holes flow from P-type region P32 or S33 through the inversion channel to region 45 or D33, instead of a small voltage spike 47*c* as shown in the drawing, there will appear a relatively large negative pulse (not shown) similar to that indicated at 47*b*. At the trailing edge of pulse 46*c*, stray capacitance produces on the bit line a small positive voltage spike 147*c*.

For the "Read 1" operation, a negative pulse 46*d* is applied to word line W3, assuming that it is desired to read one of the cells in the lowest row of the array. A P-type inversion channel is thus formed beneath the gates of each of the cells of the lowest row. However, no holes will flow in any of the inversion channels formed in memory cells which are in a logical 1 state because for that state holes are already stored in the region 45 or D33 and these regions are at substantially the same potential as the respective regions P32 and S33. As a result, there appears on the bit line corresponding to each cell of the lowest row storing a logical 1 only a small negative voltage spike 47*d* coincident with the leading edge of pulse 46*d* and a small positive voltage spike 147d coincident with the trailing edge of pulse 46d.

Further details of the operation and structure of the charge-coupled device cells may be otained from said Application Ser. No. 169,961, the disclosure of which is incorporated herein by reference. However, it will be recalled that the definitions of the logical 1 and 0 stated in said application are the reverse of those employed in the present application. Further details of the operation and structure of the field-effect transistor cells and modifications thereof, may be obtained from said U.S. Pat. No. 3,387,286, the disclosure of which is incorporated herein by reference. However, it should be noted that the field-effect transistors disclosed in said patent are of N-channel type and that all polarities disclosed in said patent are therefore the reverse of those disclosed in the present application which shows P-channel type field-effect transistors.

OPERATION OF THE READ-ONLY MODE

Figure 5:
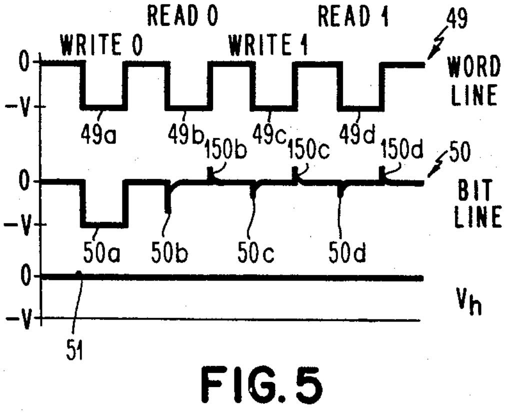
FIG. 5 shows the signal voltages on the word and bit lines and holding electrodes for the field-effect transistor memory cells when the holding electrodes are biased for operation of the array in the read-only mode.

For operation as a read-only memory, the bias voltage $V_h$ applied to bias voltage lines V1, V2 and holding electrodes such as H32, H33 is at substantially ground level as indicated at 51 in FIG. 5. This figure shows the signals on the word line and bit line for the field-effect transistor memory cells, such as cells 11 and 33, when the memory system is operated in the "read-only" mode.

It will be seen that the word line signal 49 in FIG. 5 for the read-only mode is the same as the word line signal 46 in FIG. 4 for the read-write mode, and similarly that bit line signal 50 in FIG. 5 is the same as bit line signal 47 in FIG. 4. Pulses 49*a*, 49*b*, 49*c*, 49*d* of FIG. 5 correspond respectively to pulses 46*a*, 46*b*, *c*, 46*d* of FIG. 4; pulses 50*a*, 50*b* of FIG. 5 correspond respectively to pulses 47*a*, 47*b* of FIG. 4; and voltage spikes 50*c*, 50*d*, 150*b*, 150*c*, 150*d* of FIG. 5 correspond respectively to voltage spikes 47*c*, 47*d*, 147*b*, 147*c*, *d* of FIG. 4. The field-effect transistor cells such as 11 and 33 therefore operate in the same manner during the read-only mode shown in FIG. 5 when bias voltage $V_h$ is at ground potential as in the read-write mode shown in FIG. 4 where $V_h$ is at a negative potential.

Figure 6:
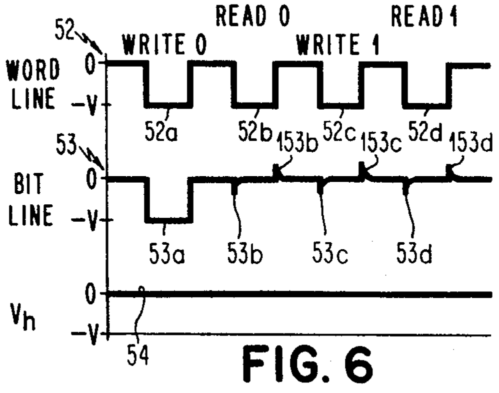
FIG. 6 shows the signal voltages on the word and bit lines and holding electrodes of the charge-coupled device memory cells when the holding electrodes are biased for operation of the array in the read-only mode.

Referring now to FIG. 6, there are shown the signals on the word line, bit line and holding electrodes during the successive read and write operations for the charge-coupled device cells when the memory system is operating in the read-only mode. In this event, the bias voltage $V_h$ is maintained at approximately ground potential as indicated at 54. The signal on the word line is indicated at 52 and the signal on the bit line is indicated at 53.

Because of the lack of a negative bias potential on the holding electrodes (such as H32) with respect to the substrate, the storage region 45 of the charge-coupled device cells cannot store holes. Hence, holes cannot flow in either direction through the inversion channel formed beneath gate 32 during negative pulses 52*a*, 52*b*, 52*c*, 52*d* applied to the word line. Therefore, during both the "Read 0" and "Read 1" operations, there appears on the bit line only a small voltage spike 53*b* or 53*d* due to stray capacitance. The sense amplifiers (not shown) attached to the bit lines interpret negative voltage spikes 53*b*, 53*d* as a logical 1 state, notwithstanding the fact that no holes are ever stored in the disappearing storage region 45 of the charge-coupled device cells during the operation of the system in the read-only mode.

During the "Write 0" operation of the charge-coupled device cells in the read-only mode, a negative pulse 53a is applied to the bit line, and at the end of the "Read 0", "Write 1", and "Read 1" operations there appear on the bit line voltage spikes 153*b*, 153*c*, 153d coincident with the trailing edges of pulses 52*b*, 52*c*, 52*d* respectively due to stray capacitance coupling. For the same reason, a small negative voltage spike 53*c* appears on the bit line in timed coincidence with the leading edge of pulse 52*c*.

Therefore, to operate the memory system of the present invention as a read-only memory, the bias voltage $V_h$ applied to the holding electrodes of the memory cells is raised to approximately ground level. Then, two alternative techniques are available. Either a logical "0" can be written into each and every cell of the memory array and then regenerated periodically, or a logical 0 may be written into each selected cell just before it is read out, in which case periodic regeneration is not required. With either technique, the field-effect transistor cells will always read a logical 0 and the charge-coupled device cells will always read a logical 1. The latent information is thus initially stored by selecting a predetermined pattern of field-effect transistor cells and charge-coupled device cells for the array when the memory is manufactured. This latent information is permanently retained and may be retrieved at any time when operating the memory in the read-only mode by raising the bias voltage applied to the holding electrodes of the cells.

PHYSICAL STRUCTURE

Figure 7:
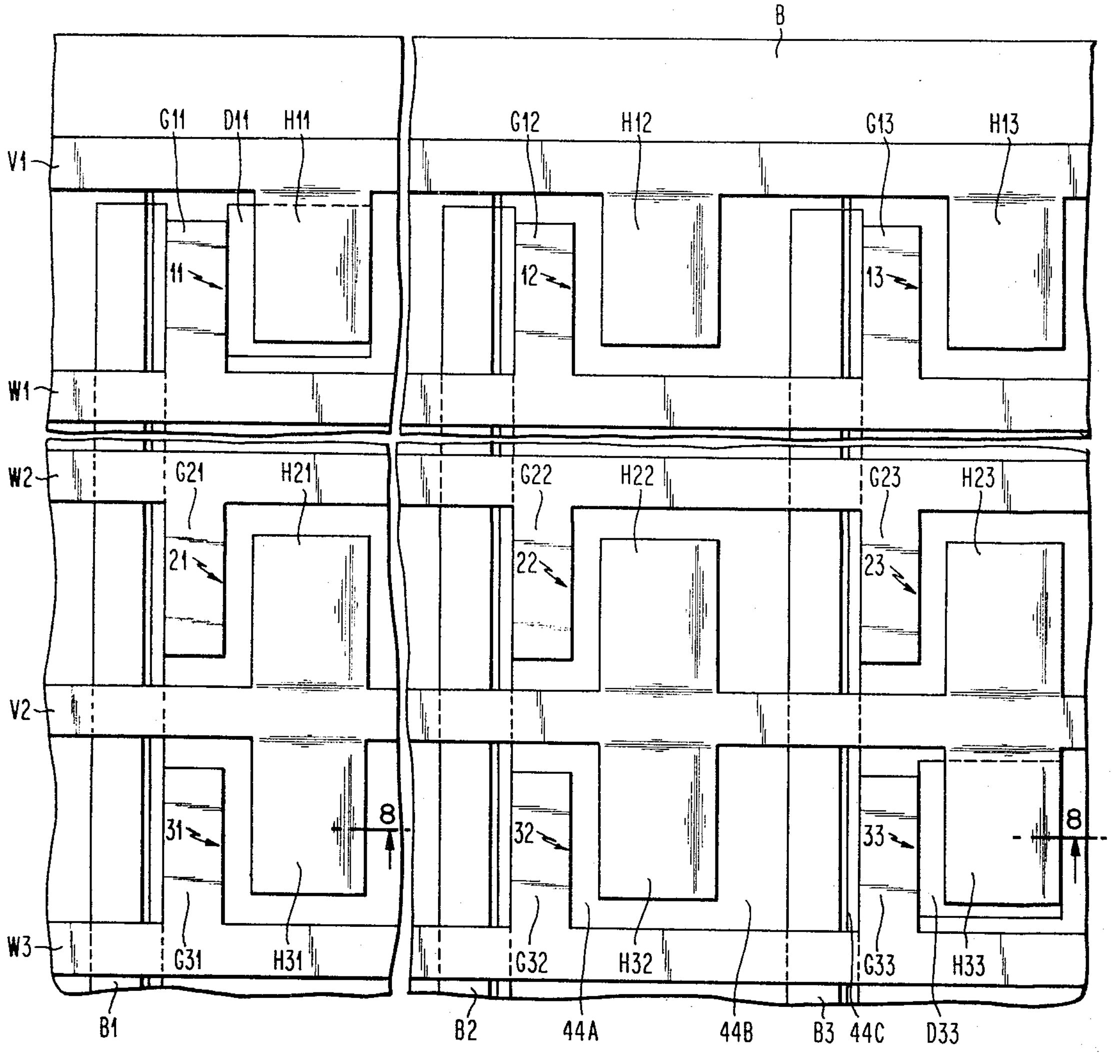
FIG. 7 is a plan view showing the physical construction of the array of FIG. 1.
Figure 8:
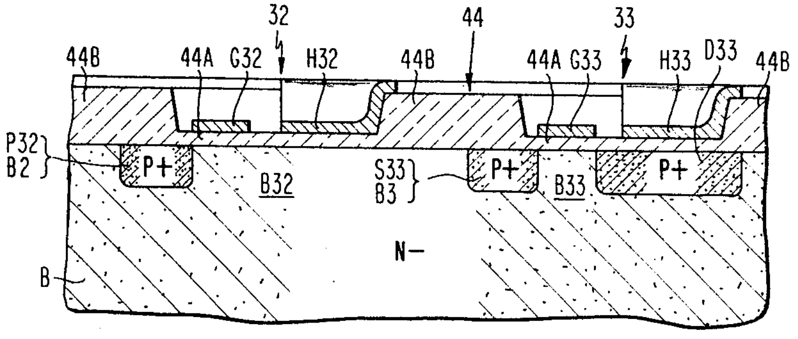
FIG. 8 is a sectional view taken substantially on the line 8—8 of FIG. 7 and showing the construction of a field-effect transistor memory cell and of a charge-coupled device memory cell.

Referring now to FIGS. 7 and 8, there is shown the physical structure of a preferred embodiment of the invention. The substrate or body portions B32, B33 of cells 32, 33, as well as the body portions of all the other cells of the array, are implemented in the form of a single unitary monolithic semiconductor chip or block B. Bit lines B1, B2, B3 are implemented in the form of longitudinal regions or strips of $P^+$ conductivity type, preferably formed by diffusion of an acceptor impurity, and extending vertically as viewed in FIG. 7. These longitudinal strips also serve as the P-type region, such as at P32 in FIG. 8, for the respective charge-coupled device cells, and as the source region, as at S33, for the field-effect transistor cells.

Each of the first row of cells 11, 12, 13 comprises a gate G11, G12, G13, respectively, and a holding electrode H11, H12, H13, respectively. Each of the second row of cells 21, 22, 23 comprises a gate G21, G22, G23, respectively, and a holding electrode H21, H22, H23, respectively. Each of the third row of cells 31, 32, 33 comprises a gate G31, G32, G33, respectively, and a holding electrode H31, H32, H33, respectively.

Gates G11, G12, G13 of the first row are formed of metal, preferably aluminum, and are formed integral with a horizontally extending aluminum strip serving as word line W1. Gates G21, G22, G23 of the second row are similarly formed integral with word line W2; and gates G31, G32, G33 of the third row are similarly formed integral with word line W3. Holding electrodes H11, H12, H13 are also formed of metal, preferably aluminum, horizontally are formed integral with a horizotnally extending aluminum strip functioning as bias voltage line V1. Holding electrodes H21, H22, H23 of the second row and also holding electrodes H31, H32, H33 of the third row are similarly formed integral with a horizontally extending aluminum strip functioning as bias voltage line V2.

Cells 11 and 33 are disclosed to be of the field-effect transistor type, and the remaining cells are disclosed to be of the charge-coupled device type. Cells 11 and 33 therefore comprise a drain region indicated at D11 and D33, respectively.

Silicon dioxide layer 44 comprises a relatively thin portion 44A extending beneath the gates, such as G32 and G33 in FIG. 8, and also beneath the holding electrodes, such as H32 and H33. The remaining portions of silicon dioxide layer 44 are relatively thick, as indicated at 44B. Thin portions 44A are preferably about 500 A. in thickness, and thick portions 44B are preferably about 6000 A. in thickness. The aluminum metallurgy forming the gates and holding electrodes is preferably about 10,000 A. in thickness. The width of the gates is preferably about 7 microns, and the width of the holding electrodes is preferably about 15 microns, with a spacing of about 3 microns between each gate and the holding electrode adjacent thereto.

The semiconductor chip or substrate is of $N^-$ conductivity type with an impurity concentration of preferably about $5 \times 10^{15}$ atoms per cc. The $P^+$-type strips implementing bit lines B1, B2, B3 and also drain regions D11, D33 preferably have an impurity concentration of about $10^{20}$ atoms per cc. Bit lines B1, B2, B3 are preferably about 7 microns in width and about 2 microns in depth. The width of the drain regions, such as D11 and D33, is substantially coextensive with that of the respective holding electrodes. Drain regions D11, D33, etc. preferably have a depth of about 2 microns.

It is to be understood that the specific embodiment of the invention shown in the drawings and described above is merely illustrative of one of the many forms which the invention may take in practice and that numerous modifications thereof will readily occur to those skilled in the art without departing from the scope of the invention which is delineated in the appended claims, and that the claims are to be construed as broadly as permitted by the prior art.

We claim:

1. A latent image memory selectively operable as either a read-write memory or a read-only memory, said latent image memory comprising
an array of memory cells,
a first set of said memory cells each comprising a first type of active device and each adapted to store either one of two binary digits,
a second set of said memory cells each comprising a second type of active device and each including means responsive to a first condition for storing either one of two binary digits and responsive to a second condition for storing only a single predetermined binary digit, and circuit means for selecting either said first condition to render the array operable as a read-write memory or said second condition to render the array operable as a read-only memory.

2. A memory as set forth in claim 1 and comprising means for supplying power to the memory,
said selecting means functioning independently of said power supplying means whereby the memory may function as a read-only memory without the necessity for first powering down and then powering up the memory.

3. A memory as set forth in claim 1 wherein
each of the memory cells of one of said sets comprises a field-effect transistor.

4. A memory as set forth in claim 3 wherein
each of the memory cells of said one set comprises a capacitor connected to the respective field-effect transistor.

5. A memory as set forth in claim 4 and comprising
a plurality of word and bit lines coupled to said field-effect transistors both to write information into the cells of said one set by charging the capacitors through the field-effect transistors and to read information out of the cells of said one set by discharging the capacitors through the field-effect transistors.

6. A memory as set forth in claim 1 wherein
each of the memory cells of one of said sets comprises a charge-coupled device.

7. A memory as set forth in claim 6 wherein each of said charge-coupled devices comprises
a body of semiconductor material embodying a first type dopant,
a diffused region of a second opposite type dopant in said body of semiconductor material,
a current carrying electrode in ohmic contact with said diffused region,
a holding electrode in spaced relation to said current carrying electrode and adapted to exert an electrical field into said body of semiconductor material, and
a gate electrode positioned between said current carrying electrode and said holding electrode,
said gate electrode being adapted to induce a conductive channel in said body of semiconductor material between said diffused region and a region adjacent said holding electrode.

8. A memory as set forth in claim 1 wherein said selecting means comprises
a plurality of holding electrodes each constituting part of a respective memory cell, and
means for selectively applying to said holding electrodes either a first voltage to effect said first condition or a second voltage to effect said second condition.

9. A memory as set forth in claim 1 wherein
each of the memory cells of one of said sets comprises a field-effect transistor and a capacitor connected to said transistor,
each of the memory cells of the other of said sets comprising a charge-coupled device.

10. A memory as set forth in claim 9 wherein said selecting means comprises
a plurality of holding electrodes each constituting part of the capacitor or the charge-coupled device of a respective memory cell, and
means for selectively applying to said holding electrodes either a first voltage to effect said first condition or a second voltage to effect said second condition.

11. A memory as set forth in claim 9 and comprising
a plurality of word and bit lines coupled to said field-effect transistors both to write information into the cells of said one set by charging the capacitors through the field-effect transistors and to read information out of the cells of said one set by discharging the capacitors through the field-effect transistors, each of said charge-coupled devices comprising
a body of semiconductor material embodying a first type dopant,
a diffused region of a second opposite type dopant in said body of semiconductor material,
a current carrying electrode in ohmic contact with said diffused region,
a holding electrode in space relation to said current carrying electrode and adapted to exert an electrical field into said body of semiconductor material, and
a gate electrode positioned between said current carrying electrode and said holding electrode,
said gate electrode being adapted to induce a conductive channel in said body of semiconductor material between said diffused region and a region adjacent said holding electrode,
said word and bit lines being coupled to said charge-coupled devices.

12. A memory as set forth in claim 11 wherein
each of said capacitors comprises a holding electrode, and
said selecting means comprises means for selectively applying to said holding electrodes of said capacitors and said charge-coupled devices either a first voltage to effect said first condition or a second voltage to effect said second condition.

13. A memory as set forth in claim 12 and comprising
means for supplying power to the memory,
said selecting means functioning independently of said power supplying means whereby the memory may function as a read-only memory without the necessity for first powering down and then powering up the memory.

14. A latent image memory selectively operable as either a read-write memory or a read-only memory, said latent image memory comprising
a first set of memory cells each comprising a field-effect transistor,
a second set of memory cells each comprising a charge-coupled device, and
selectively operable circuit means for rendering said charge-coupled device cells either capable of storing only a single pre-determined binary digit so as to provide a read-only memory, or capable of storing either one of two binary digits so as to provide a read-write memory.

15. A memory as set forth in claim 14 and comprising
means for supplying power to the memory,
said selectively operable means functioning independently of said power supplying means whereby the memory may function as a read-only memory without the necessity for first powering down and then powering up the memory.

16. A memory as set forth in claim 14 wherein each of the memory cells of said first set comprises a capacitor connected to the respective field-effect transistor.

17. A memory as set forth in claim 16 and comprising a plurality of word and bit lines coupled to said field-effect transistors both to write information into the cells of said one set by charging the capacitors through the field-effect transistors and to read information out of the cells of said one set by discharging the capacitors through the field-effect transistors.

18. A memory as set forth in claim 17 wherein each of said charge-coupled devices comprises a body of semiconductor material embodying a first type dopant, a diffused region of a second opposite type dopant in said body of semiconductor material, a current carrying electrode in ohmic contact with said diffused region, a holding electrode in spaced relation to said current carrying electrode and adapted to exert an electrical field into said body of semiconductor material, a gate electrode positioned between said current carrying electrode and said holding electrode, said gate electrode being adapted to induce a conductive channel in said body of semiconductor material between said diffused region and a region adjacent said holding electrode, said word and bit lines being coupled to said charge-coupled devices.

19. A memory as set forth in claim 18 wherein each of said capacitors comprises a holding electrode, and said selectively operable means comprises means for selectively applying to said holding electrodes of said capacitors and charge-coupled devices either a first voltage or a second voltage different from said first voltage.

20. A memory as set forth in claim 19 and comprising means for supplying power to the memory, said selectively operable means functioning independently of said power supplying means whereby the memory may function as a read-only memory without the necessity for first powering down and then powering up the memory.

21. A memory as set forth in claim 14 wherein said selectively operable means comprises a plurality of holding electrodes each constituting part of a respective memory cell, and means for selectively applying to said holding electrodes either a first voltage or a second voltage different from said first voltage.

22. A latent image memory selectively operable as either a read-write memory or a read-only memory, said latent image memory comprising a first set of memory cells each comprising a first type of active device and capable of storing either one of two binary digits, a second set of memory cells each comprising a second type of active device, and selectively operable circuit means for rendering said second type of active device cells either capable of storing only a predetermined binary digit so as to provide a read-only memory, or capable of storing either one of two binary digits so as to provide a read-write memory.

23. A memory as set forth in claim 22 and comprising means for supplying power to the memory, said selectively operable means functioning independently of said power supplying means whereby the memory may function as a read-only memory without the necessity for first powering down and then powering up the memory.

24. A memory as set forth in claim 22 wherein each of the memory cells of said first set comprises a field-effect transistor and a capacitor connected to said transistor.

25. A memory as set forth in claim 24 and comprising a plurality of word and bit lines coupled to said field-effect transistors both to write information into the cells of said first set by charging the capacitors through the field-effect transistors and to read information out of the cells of said first set by discharging the capacitors through the field-effect transistors.

26. A memory as set forth in claim 22 wherein each of the memory cells of said second set comprises a charge-coupled device.

27. A memory as set forth in claim 26 wherein each of said charge-coupled devices comprises a body of semiconductor material embodying a first type dopant, a diffused region of a second opposite type dopant in said body of semiconductor material, a current carrying electrode in ohmic contact with said diffused region, a charge storage electrode in spaced relation to said current carrying electrode adapted to exert an electrical field into said body of semiconductor material, a gate electrode positioned between said current carrying electrode and said charge storage electrode, said gate electrode being adapted to induce a conductive channel in said body of semiconductor material between said current carrying electrode and said charge storage electrode.

28. A memory as set forth in claim 22 wherein each of the memory cells of said first set comprises a field-effect transistor and a capacitor connected to said transistor, and each of the memory cells of said second set comprises a charge-coupled device.

29. A latent image memory comprising an array of memory cells arranged in rows and columns, a first set of said cells each comprising a field-effect transistor and a capacitor connected thereto, a second set of said cells each comprising a charge-coupled device, each of said field-effect transistors and said charge-coupled devices having a substrate of one conductivity type, a region therein of the opposite conductivity type, and a gate extending adjacent to and insulated from said substrate, each of said capacitors and said charge-coupled devices having a holding electrode, a plurality of word lines each connected to the gates of a respective row of cells, and a plurality of bit lines each connected to the opposite conductivity type regions of a respective column of cells.

30. A latent image memory as set forth in claim 29 and comprising means for selectively applying to said holding electrodes either a first voltage to render the array operable as a read-write memory or a second voltage to render the array operable as a read-only memory.

31. A latent image memory as set forth in claim 30 and comprising a plurality of drivers connected to said word lines, a plurality of drivers connected to said bit lines, and a plurality of sense amplifiers connected to said bit lines.

* * * * *